Patented Feb. 27, 1945

2,370,362

UNITED STATES PATENT OFFICE 2,370,362

FINISHING OF CLOTH

Donald W. Light, Longmeadow, Mass., assignor to American Cyanamid Company, New York, N. Y., a corporation of Maine No Drawing. Application January 1, 1943, Serial No. 471,025

7 Claims. (Cl. 117—161)

This invention relates to the finishing of cloth such as cotton, spun rayon, nylon, silk, wool and the like, and more particularly to the application thereto of a permanent finish that is laundry-resistant but capable of imparting a full, crisp hand of the type desired by the trade.

In my copending application, Serial No. 369,986, filed December 13, 1940, it is shown that extremely stable emulsions of aminotriazine-aldehyde resins such as melamine-formaldehyde resins are obtained by using compositions which contain high acid number alkyd resins together with the aminotriazine-aldehyde resins to be dispersed. By the use of high acid number alkyd resins; i. e., alkyd resins having an acid number of about 25 or more, there is obtained a dispersion of an aminotriazine-aldehyde and alkyd resin blend characterized by an extremely small and uniform particle size, ordinarily less than 1 micron in diameter. The high acid number alkyd resin also functions as a curing accelerator to improve the speed of cure of the aminotriazine-aldehyde resin upon heating the composition, and also functions as a placticizing or softening agent when an oil modified or oil-acid modified alkyd resin is employed.

The present application is a continuation-in-part of my earlier application referred to above, and is directed to the finishing of textile cloth by the application thereto of these fine-grained emulsions containing both aminotriazine-aldehyde resins and high acid number alkyd resins. The emulsions themselves are claimed as new compositions in my copending application, Serial No. 471,026, filed Jan. 1, 1943.

The aminotriazine-aldehyde condensation products are known chemical compounds, and are used extensively in the preparation of paints and enamels. The most representative members of this class of materials are melamine-aldehyde resins, ammeline-aldehyde resins, and acetoguanamine and formoguanamine-aldehyde resins, and any of these may be used in practicing the present invention in its broader aspects. However, melamine-aldehyde resins and particularly the melamine-formaldehyde resins are the cheapest and most readily available compositions of this class, and since they produce much better textile finishes than other aminotriazine-aldehyde resin compositions when applied in accordance with the principles of my invention they constitute a preferred species thereof.

Although melamine-formaldehyde condensation products obtained by condensing one mole of melamine with 2–6 moles of formaldehyde may be employed in conjunction with high acid number alkyd resins, better results are frequently obtained when these condensation products are first condensed with an alcohol to form an ether-type product which may be more or less polymerized. The primary condensation product of melamine with an aldehyde such as formaldehyde is an alkylol melamine, wherein the number of alkylol groups is determined by the ratio of aldehyde to melamine used in the condensation. When the freshly prepared alkylol melamines are heated with an alcohol such as methanol, ethanol, butanol, ethylene glycol and the like in the presence of small amounts of an acidic condensing agent such as phosphoric acid, water is split out between one or more alkylol groups and a hydroxyl radical of one or more moles of the alcohol and alkoxyalkyl melamines are formed. These compounds may polymerize somewhat during the heating which is necessary to remove the water, but the final product is a resin which is soluble in butanol, xylol, toluol and other organic solvents and compatible with phthalic glyceride resins in all proportions. They are plasticized by phthalic glyceride resins modified with non-drying and semi-drying oils and the fatty acids thereof, and produce excellent textile finishes when applied in the form of fine-grained emulsions.

Any high acid number phthalic glyceride resin having an acid number of 25 or more may be employed to produce a stable emulsion of fine particle size in combination with the aminotriazine-aldehyde resins described above. The stabilizing effect is most pronounced when a phthalic glyceride resin having an acid number of about 60 is used, but phthalic glyceride resins having acid numbers between 26 and 60–80 may be employed. In practicing the present invention a resin of this class modified by the incorporation of a monobasic acid is preferably employed in order to assist in plasticizing the melamine resin, which is quite brittle if no plasticizer is used. I have found that the oil-modified or oil-acid modified phthalic glyceride resins having acid numbers between about 25 and about 60–80 will function to produce aqueous emulsions of aminotriazine-aldehyde resins, and particularly melamine-aldehyde resins when used in amounts of 5–50% of the total resin solids in the emulsion. Suitable resins of this class are coconut oil fatty acid-, cottonseed oil fatty acid- and corn oil fatty acid-modified phthalic glyceride resins and similar resins modified with non-drying or semi-drying oils. Resins modified with drying oils should be avoided since they tend to discolor and become sticky upon exposure to air and also because they constitute a definite fire hazard upon storage of the cloth.

Although phthalic glyceride resins of high acid number may constitute the only alkyd resin constituent of the emulsion, textile finishing compositions of even better stability and resistance to laundering are obtained when a phthalic glyceride resin of lower acid number is also included in the composition. In many cases as little as 5-20% of high acid number phthalic glyceride resin, based on the total resin solids, is sufficient to produce stable aminotriazine-aldehyde resin emulsions of extremely small particle size, but frequently it is advisable to use considerably larger quantities of oil-modified phthalic glyceride resin to obtain a high degree of plasticizing action. By employing an alkyd resin of lower acid number such as a castor oil or coconut oil-modified phthalic glyceride resin having an acid number of 5-15 in admixture with the high acid number phthalic glyceride resin, the aminotriazine-aldehyde resin constituent of the emulsion is plasticized to the desired degree without, however, lowering its water resistance as would be the case if large quantities of high acid number phthalic glyceride resin were employed. The use of an oil modified phthalic glyceride resin as an additional plasticizing agent in conjunction with a phthalic glyceride resin of high acid number constitutes another important feature of the invention.

In preparing aqueous emulsions for application to textiles any suitable emulsifying agent may be employed, but I greatly prefer to use an alkali solubilized casein for this purpose. Gelatin, glue, gum tragacanth and other gums and waxes may be employed when an acid-stable emulsion is desired, but for application to spun rayon and cotton fabrics the alkali caseinate solutions produce much better emulsions. Ammonium caseinate, prepared by soaking casein in water and adding sufficient ammonium hydroxide to produce a stable solution, constitutes the preferred emulsifying agent for use in practicing the invention.

A further important advantage of the emulsions of the present invention resides in the fact that no special emulsifying equipment is required, and the emulsions can readily be prepared in textile mills as they are needed. The aminotriazine-aldehyde resin, which may be present in amounts of about 35-85% of the total resin solids in the emulsion, is simply mixed with the high acid alkyd resin and the low acid number oil-modified alkyd resin if the latter is used, a mutual solvent such as butanol, xylol, toluol or mixtures thereof being employed as a solvent to liquefy the mixture if necessary. An aqueous solution of an emulsifying agent such as water having dissolved therein about 2-10% of ammonium caseinate is heated to about 45° C. and is then slowly added to the resin mixture with vigorous agitation. As the emulsifying agent is slowly added an emulsion of the water-in-oil type is first obtained, but upon continued addition of the emulsifying solution the emulsion inverts to the oil-in-water type. This emulsion is found to consist of very small and uniform particles of the resin solution dispersed throughout the aqueous medium. Emulsions of aminotriazine-aldehyde resins such as melamine-formaldehyde resin, and particularly emulsions of alkoxyalkyl melamine prepared in this manner remain stable for periods of many months and may be further diluted with water to any concentration desired for application to textile fabrics without coarsening or breaking.

The above-described emulsions may be applied to textile fabrics by any suitable method. Thus, for example, the fabric may be impregnated with the aqueous emulsion by passing a strip of the fabric through a pad box, or the emulsion may be applied by sprays, by coating rolls, or by any other mechanical device of this nature. The impregnated or coated fabric is preferably passed through a mangle or squeeze rolls to insure uniform retention, after which the fabric is dried in an oven at about 225-275° F. The dried fabric is then preferably given a short cure at higher temperatures, for example about 5 minutes at 290-300° F., whereupon a properly sized fabric is obtained. In most cases it is unnecessary to subject the impregnated fabric to laundering or other after-treatment to soften the finish as the plasticizing action of the alkyd resin is such that a desirable hand is given immediately to the fabric. The melamine-aldehyde—alkyd resin blend is, however, a permanent finish and is retained by the fabric to a high degree even after repeated launderings.

The invention will be described in greater detail with reference to the following specific examples. It should be understood, however, that these examples are given merely by way of illustration and that the invention in its broader aspects is not limited thereto.

*Example 1*

45 parts by weight of a solution containing 9 parts by weight of toluene and 36 parts by weight of a cottonseed oil-modified alkyd resin containing 72% of phthalic glyceride (calculated) and having an acid number in the range of 60 to 80 was mixed with a solution containing 108 parts by weight of a solution containing 18.5 parts by weight of butanol and 89.5 parts by weight of a castor oil-modified alkyd resin containing 50% phthalic glyceride (calculated) and having an acid number of 6 to 8. The foregoing mixture of alkyd resins had an acid number of about 29. To this mixture of alkyd resins was added 181 parts by weight of a 50% solution in a mixed 60% butanol-40% xylol solvent of a butylated methylol melamine resin prepared from 5 molecular equivalents of formaldehyde and one molecular equivalent of melamine, the resin being approximately 30% butylated. The resin solutions were thoroughly mixed and at room temperature an aqueous solution of ammonium caseinate prepared from 289 parts by weight of water, 26 parts by weight of casein and 18 parts by weight of 26° Bé. ammonia was then slowly poured into the resin solution while stirring vigorously with a propeller type agitator. A water-in-oil emulsion was first formed but when most of the ammonium caseinate solution had been added it inverted to an emulsion of the oil-in-water type having a uniform particle size of less than one micron. The emulsion was then diluted further with 333 parts by weight of water. This emulsion remained stable over a period of several months.

The permanency of this composition as a textile finishing agent was demonstrated by treating a sample of spun rayon cloth with the emulsion diluted to 6% solids with water. After impregnating the cloth so that it took up 4% of resin solids it was dried for 5 minutes at 240° F. Another sample of the same cloth was dried 5 minutes at 240° F. and then cured for 4 minutes at 284° F. Both samples had a full, springy and otherwise desirable hand. They were then washed for 4 hours in a 0.25% soap solution at 160° F., rinsed and dried. Despite this severe washing treatment the sample which had been dried for 5 minutes at 240° F. retained 84.2% of the resin finish and the sample that had been dried and cured retained 92.1% of the resin finish.

*Example 2*

An emulsion of butylated methylol melamine in an alkyd resin mixture containing an oil-modified alkyd resin of high acid number was prepared as described in Example 1 at 24% total solids. This emplsion was used for the finishing of spun rayon cloth, such as challis, gabardine or twill, poplin and the like.

A finishing bath was prepared by adding 100 pounds of the emulsion (24% solids) to 100 gallons of water warmed to 120° F. The cloth to be treated was padded in this diluted emulsion, passed through squeeze rolls set to retain a weight of emulsion equal to the weight of the cloth, and dried on frames at 250° F. The dried cloth was then cured for 5 minutes by heating in an oven at 290–300° F.

No washing of the cloth was necessary after the curing step, and the treated cloth was found to have a full, crisp hand.

*Example 3*

For the treatment of heavy cotton sheeting for interlining fabrics such as for the stiffening of shirt collars, coat lapels and the like, the emulsion of the present invention is used in a more concentrated form. 100 parts of the emulsion described in Example 2 (24% solids) is preferably diluted with an equal quantity of water warmed to 120° F. and the emulsion is applied to the cloth at 12% solids. Heavy cotton sheeting is padded in this emulsion, run through a mangle, dried on frames, and cured at 290–300° F., after which it may be ironed, if desired, to improve the stiffness of the frames. Heavy cotton cloth treated in this manner is well suited for use as a stiffening and reinforcing agent, since it does not lose its stiffness upon laundering or moistening nor by the action of steam in pressing.

*Example 4*

200 parts by weight of a melamine-formaldehyde resin syrup consisting of 50% of tetramethylol melamine, 25% of butanol and 25% of xylol were mixed with 20 parts of a coconut oil fatty acid-modified phthalic glyceride resin having an acid number of about 57–66 at a temperature of 45° C. 265 parts of an ammonium caseinate solution containing 7.8% casein and 5.3% of 28% ammonium hydroxide was heated to 40° C. and then slowly added with stirring. An emulsion of the oil-in-water type having particles of from 1 to 2 microns in size was obtained.

This emulsion was diluted with water to 5% resin solids and spun rayon challis was impregnated therewith by padding, passed through squeeze rolls to retain a weight of emulsion equal to the weight of the cloth, oven dried at 240° F., and cured by heating for 5 minutes at 290° F. A permanently sized and laundry-resistant finish was obtained that imparted to the fabric a full, crisp hand.

What I claim is:

1. A method of producing a laundry-resistant finish on cloth which comprises impregnating the cloth with an emulsion of the oil-in-water type in which the continuous phase is an aqueous solution of an emulsifying agent and the dispersed phase contains a mixture of a phthalic glyceride resin having an acid number of 25–80 and a melamine-formaldehyde resin and then drying the impregnated cloth.

2. A method of producing a laundry-resistant finish on cloth which comprises impregnating the cloth with an emulsion of the oil-in-water type in which the continuous phase is an aqueous solution of an emulsifying agent and the dispersed phase contains a mixture of a phthalic glyceride resin having an acid number of 25–80, an oil-modified phthalic glyceride resin having an acid number of about 5–15 and a melamine-formaldehyde resin and then drying the impregnated cloth.

3. A method of producing a laundry-resistant finish on cloth which comprises impregnating the cloth with an emulsion of the oil-in-water type in which the continuous phase is an aqueous solution of an emulsifying agent and the dispersed phase comprises a mixture of synthetic resins containing about 5 to 50% of a phthalic glyceride resin modified by the incorporation of a monobasic acid and having an acid number of 25 to 80 and about 35% to 85% of a melamine-formaldehyde resin and then drying the impregnated cloth.

4. A method of producing a laundry-resistant finish on cloth which comprises impregnating the cloth with an emulsion of the oil-in-water type in which the continuous phase is an aqueous solution of an emulsifying agent and the dispersed phase comprises a mixture of synthetic resins containing about 20–21% of a phthalic glyceride resin modified with a member of the group consisting of non-drying and semi-drying oils and fatty acids thereof and having an acid number between 25 and 80, about 26% of a phthalic glyceride resin modified with a member of the group consisting of non-drying and semi-drying oils and fatty acids thereof and having an acid number of 5–15 and about 52–53% of a melamine-formaldehyde resin, and then heating the impregnated cloth to cure the finish thereon.

5. A method according to claim 1 in which the melamine-formaldehyde resin is an alkoxymethol melamine resin.

6. A method according to claim 3 in which the melamine-formaldehyde resin is an alkoxymethyl melamine resin.

7. A method of producing a laundry-resistant finish on cloth which comprises impregnating the cloth with an emulsion of the oil-in-water type in which the continuous phase is an aqueous solution of an emulsifying agent and the dispersed phase contains a mixture of a cottonseed fatty acid-modified phthalic glyceride resin having an acid number of 60–80, a castor oil-modified phthalic glyceride resin having an acid number of about 6 to 8 and an organic solvent-soluble melamine-formaldehyde resin and then heating the impregnated cloth to cure the finish thereon.

DONALD W. LIGHT.